(12) United States Patent
Springer

(10) Patent No.: US 11,821,166 B2
(45) Date of Patent: Nov. 21, 2023

(54) INTERNAL SUPPORT STRUCTURE FOR UNDERGROUND BATTERY MACHINES

(71) Applicant: Caterpillar Underground Mining Pty. Ltd., South Burnie (AU)

(72) Inventor: Steven Denis Springer, Naperville, IL (US)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 443 days.

(21) Appl. No.: 16/936,075

(22) Filed: Jul. 22, 2020

(65) Prior Publication Data
US 2022/0025609 A1  Jan. 27, 2022

(51) Int. Cl.
*B62D 21/18*  (2006.01)
*E02F 9/08*  (2006.01)

(52) U.S. Cl.
CPC .......... *E02F 9/0808* (2013.01); *B62D 21/186* (2013.01); *E02F 9/0883* (2013.01); *E02F 9/0866* (2013.01)

(58) Field of Classification Search
CPC .... B62D 21/186; E02F 9/0808; E02F 9/0858; E02F 9/0866; E02F 9/0883; E02F 9/2058; E02F 9/2091; E02F 9/2095
See application file for complete search history.

(56) References Cited

U.S. PATENT DOCUMENTS

| | | | |
|---|---|---|---|
| 2,256,314 A * | 9/1941 | Dunham | B66F 9/07572 180/908 |
| 4,450,925 A * | 5/1984 | Gardner | B62D 21/186 172/98 |
| 7,832,519 B2 | 11/2010 | Sakamoto et al. | |
| 8,342,789 B2 | 1/2013 | Yasunda et al. | |
| 8,800,704 B2 | 8/2014 | Kitaoka et al. | |
| 9,751,394 B1 * | 9/2017 | Speichinger | E02F 9/0866 |
| 9,944,140 B2 * | 4/2018 | Springer | B60D 1/242 |
| 10,000,908 B2 * | 6/2018 | Ota | B60K 1/04 |
| 10,427,493 B2 * | 10/2019 | Smith | B60H 1/00007 |
| 2002/0139597 A1 * | 10/2002 | Kinoshita | B60K 17/356 180/242 |

(Continued)

FOREIGN PATENT DOCUMENTS

| | | | | |
|---|---|---|---|---|
| CN | 103947336 A | * | 7/2014 | |
| CN | 101987573 B | * | 7/2015 | ............. B60K 11/04 |

(Continued)

*Primary Examiner* — Barry Gooden, Jr.

(57) ABSTRACT

An internal support structure for fuel cells within a work machine having a rear end frame with an exterior frame wall in which the fuel cells are stored is disclosed. The internal support structure may include a radiator support housing, a first pedestal and a second pedestal mounted to and extending upward from the bottom wall. The radiator support housing may be disposed proximate a radiator opening of the exterior frame wall, and the pedestals may be disposed forward of the radiator support housing. A first rail may be mounted to the radiator support housing and the first pedestal, and a second rail may be mounted to the radiator support housing and the second pedestal. The internal support structure and the exterior frame wall may define fuel cell cavities for the fuel cell, and a component cavity from components of the electrical power system of the work machine.

20 Claims, 3 Drawing Sheets

(56) References Cited

U.S. PATENT DOCUMENTS

| | | | | |
|---|---|---|---|---|
| 2009/0121521 A1* | 5/2009 | Sakamoto | ............ | B62D 21/186 |
| | | | | 296/203.01 |
| 2010/0258364 A1* | 10/2010 | Bolz | ............ | E02F 9/0866 |
| | | | | 180/9.1 |
| 2013/0026789 A1 | 1/2013 | Schott et al. | | |
| 2013/0071212 A1 | 3/2013 | Yunoue et al. | | |
| 2015/0056052 A1* | 2/2015 | Kokuryou | ............ | E02F 9/0808 |
| | | | | 414/687 |
| 2015/0136505 A1* | 5/2015 | Bystedt | ............ | B60L 15/20 |
| | | | | 180/6.7 |
| 2015/0345110 A1* | 12/2015 | Takeuchi | ............ | H01M 50/204 |
| | | | | 180/65.21 |
| 2016/0237649 A1* | 8/2016 | Huissoon | ............ | E02F 9/2079 |
| 2016/0347163 A1* | 12/2016 | Dorsett | ............ | B60L 50/16 |
| 2016/0347167 A1* | 12/2016 | Dorsett | ............ | B60K 7/0007 |
| 2016/0369478 A1* | 12/2016 | Kokuryou | ............ | E02F 9/0866 |
| 2017/0107689 A1 | 4/2017 | Ducheneaux et al. | | |
| 2017/0151854 A1* | 6/2017 | Smith | ............ | B60H 1/00007 |
| 2017/0166022 A1* | 6/2017 | Springer | ............ | B60D 1/565 |
| 2018/0208011 A1* | 7/2018 | Wigg | ............ | B60G 17/0152 |
| 2019/0119883 A1* | 4/2019 | Ichihara | ............ | E02F 9/0866 |
| 2020/0277175 A1* | 9/2020 | Rushton | ............ | B66F 17/006 |
| 2021/0087789 A1* | 3/2021 | Stoecker | ............ | E02F 9/207 |
| 2022/0025610 A1* | 1/2022 | Springer | ............ | E02F 9/0866 |
| 2022/0098832 A1* | 3/2022 | Hickey | ............ | B60L 58/22 |
| 2022/0275601 A1* | 9/2022 | Kunizawa | ............ | F01P 3/22 |

FOREIGN PATENT DOCUMENTS

| | | | | |
|---|---|---|---|---|
| CN | 211943518 U | * | 11/2020 | |
| CN | 114508148 A | * | 5/2022 | |
| CN | 115162121 A | * | 10/2022 | |
| EP | 1985767 A1 | * | 10/2008 | ............ B60K 1/04 |
| JP | 2008195172 A | * | 8/2008 | |
| WO | WO-2006132170 A1 | * | 12/2006 | ............ B60K 11/04 |
| WO | WO-2014069684 A1 | * | 5/2014 | ............ B60K 11/04 |
| WO | WO-2020004327 A1 | * | 1/2020 | ............ B60K 11/04 |

\* cited by examiner

INTERNAL SUPPORT STRUCTURE FOR UNDERGROUND BATTERY MACHINES

TECHNICAL FIELD

The present disclosure relates generally to underground battery machines and, more particularly, to internal support structures for organizing and storing batteries and related components within frames of underground battery machines.

BACKGROUND

Generally, work machines such as hydraulic excavators and load-haul-dump (LHD) machines that are used in excavating operations and demolition operations employ an internal combustion engine as a power source to drive a transmission, one or more hydraulic pumps and other systems of the work machines. In some implementations, it is desirable to minimize or eliminate discharge of exhaust gases into the working environment. This may be particularly desirable in enclosed environments such as underground mines or building structures where the working environment can deteriorate due to exhaust gas from internal combustion engines at the time of performing excavation, demolition or other work operations within the enclosed environment. For both enclosed environments and open air environments, electric-powered work machines have been developed that have electric motors with electricity supplied by fuel cells as power sources for driving propulsion, hydraulic and other systems instead of exhaust-producing internal combustion engines.

In addition to the fuel cells, electric-powered work machines have other components necessary to convert the electric power stored in the fuel cells to a form that is usable to operate the electric motor, to transmit the converted electric power to the electric motor, and to ensure safe operation of the work machine. Such components may include 24 volt batteries, DC-to-DC converters, power lines and fire suppression components. The fuel cells and other components must be packaged within the packaging constraints of the work machines along with components of other systems of the work machines.

An example of such packaging is disclosed in U.S. Pat. Appl. Publ. No. 2013/0071212 by Yunoue et al. that published on Mar. 21, 2013, and is entitled "Electrical Construction Machine." In the Yunoue et al. publication, a hydraulic pump, electric motor, inverter, oil tank, heat exchanger, and battery are mounted on a revolving frame, and are covered by an exterior cover. The revolving frame is provided with a partition plate, and the interior of the exterior cover is partitioned by the partition plate into a machine room for accommodating the hydraulic pump and the electric motor and into a battery room for accommodating the battery. A cooling fan is arranged in the machine room so that outside air is introduced into the machine room through an oil tank cooling air inlet port and an inverter cooling air inlet port which are provided in the exterior cover. The outside air cools the hydraulic pump, the electric motor, and the oil tank in the machine room and is exhausted to the outside of the machine room through an exhaust port.

SUMMARY OF THE DISCLOSURE

In one aspect of the present disclosure, an internal support structure for fuel cells within a work machine is disclosed. The work machine may have a rear end frame with an exterior frame wall in which the fuel cells are stored. The internal support structure may include a radiator support housing mounted to a bottom wall of the rear end frame, extending upward from the bottom wall and disposed proximate a radiator opening of the exterior frame wall, a first pedestal mounted to the bottom wall, extending upward from the bottom wall and disposed forward of the radiator support housing, a second pedestal mounted to the bottom wall, extending upward from the bottom wall and disposed forward of the radiator support housing, a first rail mounted to the radiator support housing and the first pedestal, and a second rail mounted to the radiator support housing and the second pedestal.

In another aspect of the present disclosure, a work machine is disclosed. The work machine may include a rear end frame having an exterior frame wall and a bottom wall, and an internal support structure. The internal support structure may include a radiator support housing mounted to the bottom wall of the rear end frame, extending upward from the bottom wall and disposed proximate a radiator opening of the exterior frame wall, a first pedestal mounted to the bottom wall, extending upward from the bottom wall and disposed forward of the radiator support housing, a second pedestal mounted to the bottom wall, extending upward from the bottom wall and disposed forward of the radiator support housing, a first rail mounted to the radiator support housing and the first pedestal, and a second rail mounted to the radiator support housing and the second pedestal.

In a further aspect of the present disclosure, an internal support structure for fuel cells within a work machine is disclosed. The work machine may have a rear end frame with an exterior frame wall in which the fuel cells are stored. The internal support structure may include a radiator support housing mounted to a bottom wall of the rear end frame, extending upward from the bottom wall and disposed proximate a radiator opening of the exterior frame wall, a first pedestal mounted to the bottom wall, extending upward from the bottom wall and disposed forward of the radiator support housing, and a second pedestal mounted to the bottom wall, extending upward from the bottom wall and disposed forward of the radiator support housing. The internal support structure may further include a first rail mounted to the radiator support housing and the first pedestal, wherein the first pedestal, the first rail, a first frame portion of the exterior frame wall and a first bottom portion of the bottom wall define a first fuel cell cavity in which a first fuel cell of the fuel cells is disposed, a second rail mounted to the radiator support housing and the second pedestal, wherein the second pedestal, the second rail, a second frame portion of the exterior frame wall and a second bottom portion of the bottom wall define a second fuel cell cavity in which a second fuel cell of the fuel cells is disposed, and wherein the radiator support housing, the first pedestal, the second pedestal, the first rail, the second rail and a central bottom wall portion of the bottom wall define a component cavity that receives components of an electrical power system of the work machine, and a support tray mounted between the first rail and the second rail, wherein the support tray receives and supports a battery within the rear end frame.

Additional aspects are defined by the claims of this patent.

DETAILED DESCRIPTION

Figure 1:
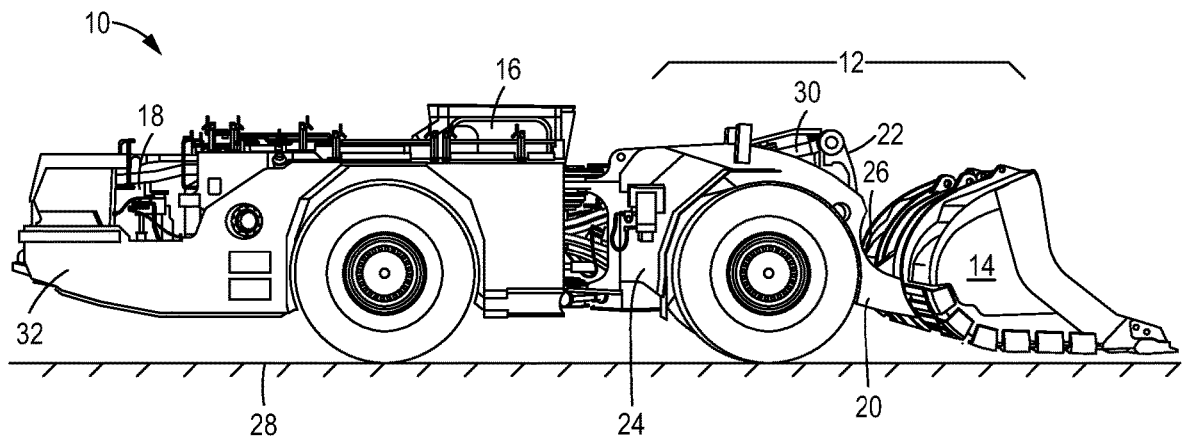
FIG. 1 is side view of an exemplary work machine in which an internal support structure in accordance with the present disclosure may be implemented.

FIG. 1 illustrates an exemplary work machine 10 having multiple systems and components that cooperate to move material such as ore, overburden, waste, etc. as the work machine 10 operates on a work surface 28. In the disclosed example, the work machine 10 is a load-haul-dump machine (LHD). It is contemplated, however, that the work machine 10 could embody another type of excavation machine (e.g., a wheel loader or a carry dozer), if desired. The work machine 10 may include, among other things, a linkage arrangement 12 configured to move a work tool 14, an operator station 16 for manual control of linkage arrangement 12, and a power source 18 (e.g., a motor and accompanying fuel cells) that provides electrical, hydraulic, and/or mechanical power to the linkage arrangement 12 and the operator station 16.

The linkage arrangement 12 may include fluid actuators that exert forces on structural components of the work machine 10 to cause lifting and tilting movements of the work tool 14. Specifically, the linkage arrangement 12 may include, among other things, a pair of spaced apart generally plate-like lift arms 20, and a bell crank 22 centered between and operatively connected to the lift arms 20. The lift arms 20 may be pivotally connected at a proximal end to a front end frame 24 of the work machine 10 and at a distal end to the work tool 14. The bell crank 22 may be pivotally connected to the work tool 14 directly, or indirectly via a tilt link 26. A pair of substantially identical lift cylinders (not shown) may be pivotally connected at a first end to the front end frame 24 and at an opposing second end to the lift arms 20. A tilt cylinder 30 may be located between the lift arms 20 and pivotally connected at a first end to the front end frame 24 and at an opposing second end to the bell crank 22. With this arrangement, extensions and retractions of the lift cylinders may function to raise and lower the lift arms 20, respectively, along with the connected work tool 14, the bell crank 22, and the tilt link 26. Similarly, extensions and retractions of the tilt cylinder may function to rack and dump the work tool 14, respectively. This arrangement may be recognized as similar to a commonly known Z-bar linkage. It is contemplated, however, that the work machine 10 could have another linkage arrangement, if desired.

Numerous different work tools 14 may be attachable to a single work machine 10 and controllable via the operator station 16. The work tool 14 may include any device used to perform a particular task such as, for example, a bucket as shown in FIG. 1), a fork arrangement, a blade, a shovel, a crusher, a shear, a grapple, a grapple bucket, a magnet, or any other task-performing device known in the art. Although connected in the embodiment of FIG. 1 to lift and tilt relative to the work machine 10, the work tool 14 may alternatively or additionally rotate, swing, slide, extend, open and close, or move in another manner known in the art.

The operator station 16 may be configured to receive input from a machine operator indicative of a desired work tool movement. Specifically, the operator station 16 may include one or more input devices (not shown) embodied, for example, as single or multi-axis joysticks located proximal an operator seat (not shown). The input devices may be controllers configured to position and/or orient the work tool 14 by producing a work tool position signal that is indicative of a desired work tool speed and/or force in a particular direction. The position signal may be used to actuate any one or more of the tilt cylinder 30 and the lift cylinders. It is contemplated that different input devices may additionally or alternatively be included within the operator station 16 such as, for example, wheels, knobs, push-pull devices, switches, pedals, and other operator input devices known in the art. It is contemplated that the operator station 16 could be omitted in applications where the work machine 10 is remotely or autonomously controlled, if desired.

The power source 18 may be supported by a rear end frame 32 of the work machine 10, and configured to generate the electrical, hydraulic, and/or mechanical power discussed above. In the disclosed embodiment, the work machine 10 is configured to be used in an enclosed space such as an underground mine where it is desirable to minimize or eliminate emissions from the work machine 10. Consequently, the power source 18 for the work machine 10 in accordance with the present disclosure is an electric motor (not shown), accompanying fuel cells and additional components that may be necessary to convert the electrical energy stored in the fuel cells into a form necessary to power the electric motor.

Figure 2:
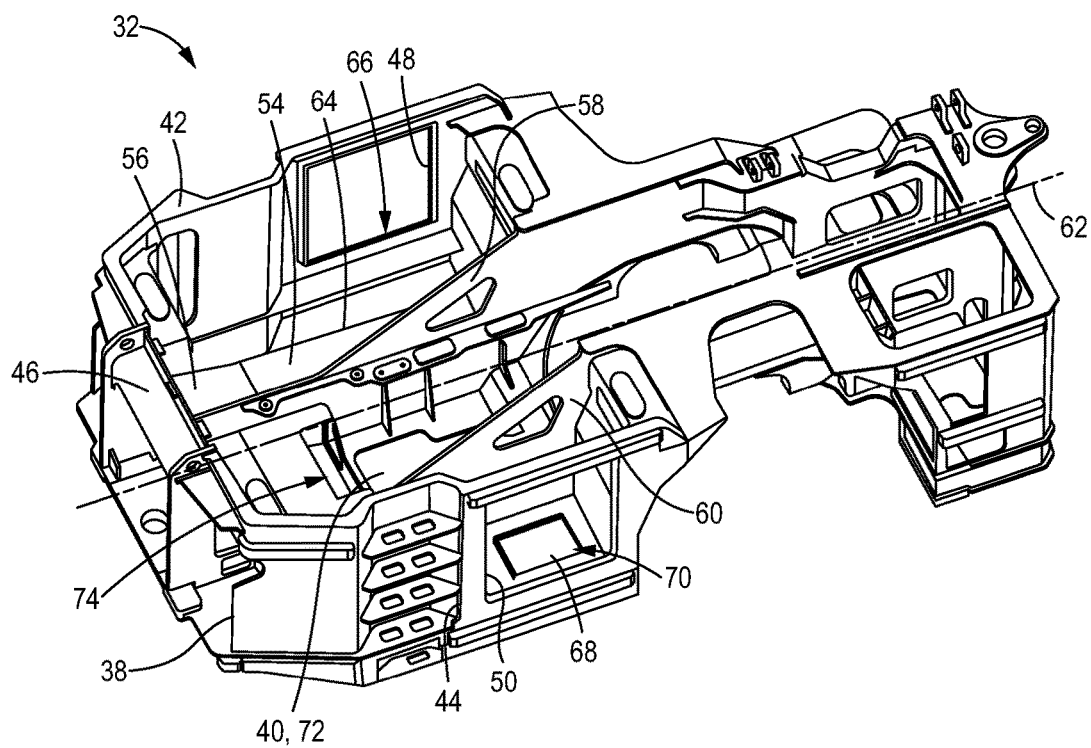
FIG. 2 is an isometric view of a portion of a rear end frame of the work machine of FIG. 1.
Figure 3:
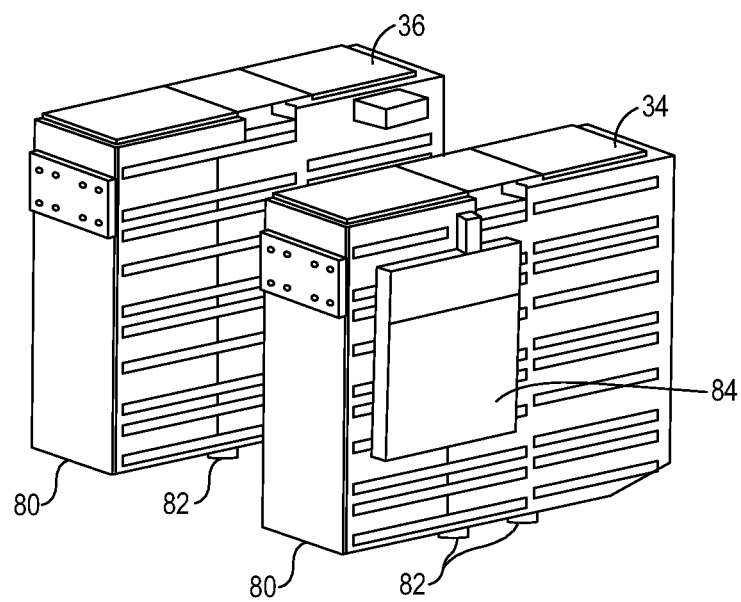
FIG. 3 is an isometric view of exemplary fuel cells for the work machine of FIG. 1.

Referring to FIG. 2, a portion of the rear end frame 32 is illustrated with external panels removed to show internal structural components. FIG. 3 illustrates a first fuel cell 34 and a second fuel cell 36 that will be received by the rear end frame 32 and will power the motor of the work machine 10. The rear end frame 32 in the illustrated embodiment includes an exterior frame wall 38 that surrounds a compartment in which the fuel cells 34, 36 will be stored, and a bottom wall 40 upon which the fuel cells 34, 36 will be supported. The exterior frame 38 may have a first frame portion 42 on one side of the work machine 10, a second frame portion 44 on the opposite side of the work machine 10, and a rear frame portion 46 at the tail end of the rear end frame 32. The first frame portion 42 may have a first fuel cell access panel opening 48 defined therein for providing access to the first fuel cell 34 from an exterior of the rear end frame 32 when the first fuel cell 34 is disposed within the rear end frame 32. Similarly, the second frame portion 44 may have a second fuel cell access panel opening 50 defined therein for providing access to the second fuel cell 36. The rear frame portion 46 is illustrated has a radiator opening 52 defined therein to allow airflow to a radiator (not shown) mounted within the rear end frame 32.

As mentioned, the bottom wall 40 will support the fuel cells 34, 36 within the rear end frame 32. The bottom wall 40 may be contoured as necessary for operation of the work machine 10. In the illustrated embodiment, the bottom wall 40 includes a horizontal bottom wall portion 54 that may be approximately parallel to the work surface 28 that supports the work machine 10, and an angled bottom wall portion 56. The angled bottom wall portion 56 may extend rearward from the horizontal bottom wall portion 54 such that a distance between the angled bottom wall portion 56 and the work surface 28 increases as the angled bottom wall portion 56 extends rearward from horizontal bottom wall portion 54 toward the tail end of the rear end frame 32.

The rear end frame 32 may further include a first structural support 58 in a second structural support 60 within the exterior frame wall 38. The structural supports 58, 60 may be approximately parallel to a longitudinal axis 62 extending in the direction of movement of the work machine 10. The structural supports 58, 60 reinforce the rear end frame 32 and separate the rear end frame 32 into a plurality of cavities that will receive the fuel cells 34, 36 and other components of the electrical power system of the work machine 10. The first frame portion 42 of the exterior frame wall 38, a first bottom wall portion 64 of the bottom wall 40 and the first structural support 58 define a first fuel cell cavity 66 that will receive the first fuel cell 34 therein. Similarly, the second frame portion 44 of the exterior frame wall 38, a second bottom wall portion 68 of the bottom wall 40 and the second structural support 60 define a second fuel cell cavity 70 that will receive the second fuel cell 36 therein. The structural supports 58, 60 are laterally spaced from each other, and combined with a central bottom wall portion 72 of the bottom wall 40 to define a component cavity 74 that receives other components of the electrical power system of the work machine 10.

As shown in FIG. 3, the fuel cells 34, 36 are configured to fit within the fuel cell cavities 66, 70, respectively. Consequently, the fuel cells 34, 36 may have bottom walls 80 that are shaped to match the contour of the bottom wall 40 formed by the horizontal bottom wall portion 54 and the angled bottom wall portion 56. The fuel cells 34, 36 may further include vibration dampening mounts 82 that will be disposed between the bottom wall 40 and the bottom walls 80 of the fuel cells 34, 36 to absorb vibration and reduce stresses that may be transmitted from the rear end frame 32 to the fuel cells 34, 36. The fuel cells 34, 36 may further include control component panels 84 with components for which access may be necessary while the fuel cells 34, 36 are installed in the rear end frame 32. The control component panels 84 may be sized and positioned on the fuel cells 34, 36 to align with the corresponding access panel openings 48, 50, respectively, in the exterior frame wall 38 so that the control component panels 84 are accessible without removing the fuel cells 34, 36 from the rear end frame 32.

Figure 4:
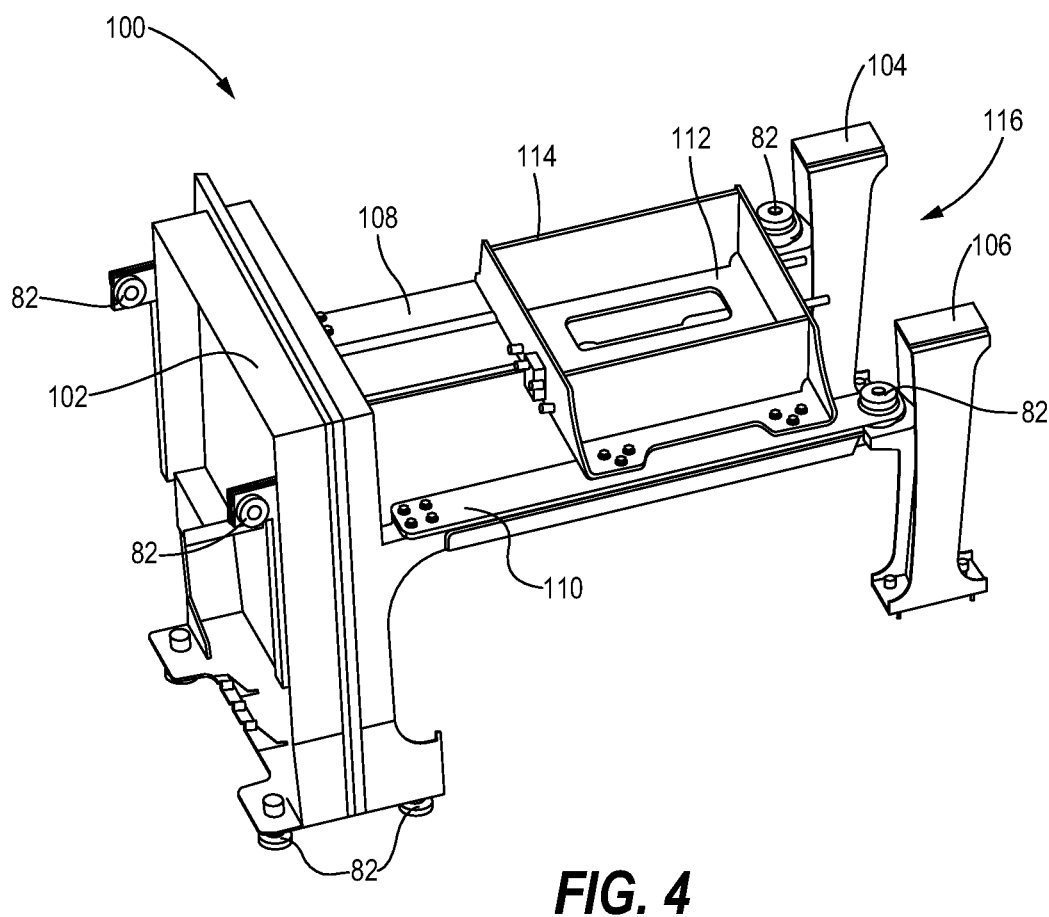
FIG. 4 is an isometric view of an embodiment of an internal support structure in accordance with the present disclosure that may be implemented in the rear end frame of FIG. 2.

FIG. 4 illustrates an internal support structure 100 that may be disposed within the rear end frame 32 to further provide for support and organization of the fuel cells 34, 36 and other components of the electrical power system of the work machine 10. The internal support structure 100 may include a radiator support housing 102 having an upright orientation, and a first pedestal 104 and a second pedestal 106 that are positioned opposite the radiator support housing 102. A first rail 108 is mounted between the radiator support housing 102 and the first pedestal 104, and a second rail 110 is mounted between the radiator support housing 102 and the second pedestal 106. The internal support structure 100 may further include a support tray 112 that is mounted between the first rail 108 and the second rail 110. The support tray 112 may have a raised outer wall 114 that is dimensioned to receive and retain a component of the electrical power system such as a 12 V battery. The internal support structure 100 may further include vibration dampening mounts 82 similar to those discussed above at various locations to reduce vibrations and stress on the components of the internal support structure 100 and the components of the electrical power system supported and retained by the internal support structure 100.

Figure 5:
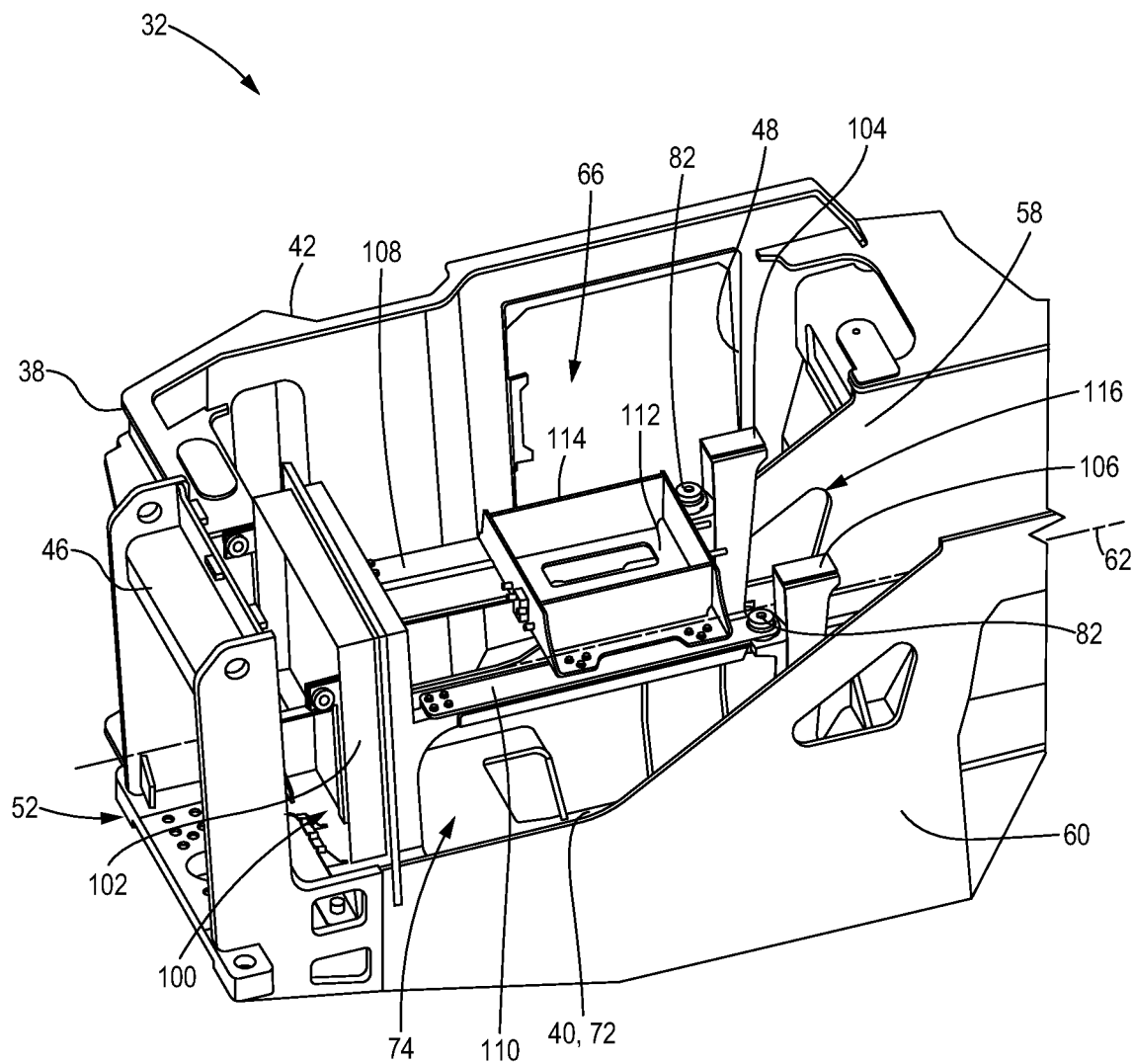
FIG. 5 is an isometric view of the internal support structure of FIG. 4 installed within the rear end frame of FIG. 2.

The rear end frame 32 is illustrated in FIG. 5 with the internal support structure 100 installed therein. The second frame portion 44 has been removed to reveal the arrangement of the internal support structure more fully 100 within the rear end frame 32. The radiator support housing 102 is mounted to the bottom wall 40 and extends upward therefrom. The radiator support housing 102 is disposed proximate the radiator opening 52 in the rear frame portion 46 to provide airflow over a radiator (not shown) mounted within the radiator support housing 102. The first pedestal 104 and the second pedestal 106 are mounted to and extend upward from the bottom wall 40, and her disposed forward of the radiator support housing 102 along the longitudinal axis 62. The pedestals 104, 106 are spaced apart laterally and define a line passage 116 there between through which electrical and cooling lines (not shown) may pass from the component cavity 74 forward toward the front end frame 24 of the work machine 10.

The components of the internal support structure 100 assist in dividing and organizing the rear end frame 32 for efficiently receiving the fuel cells 34, 36 and the components of the electrical power system. To that end, the first pedestal 104 and the first rail 108 cooperate with the first frame portion 42, the first bottom wall portion 64, and the first structural support 58 in defining the first fuel cell cavity 66. On the opposite side of the rear end frame 32, the second pedestal 106 and the second rail 110 cooperate with the second frame portion 44, the second bottom wall portion 68 and the second structural support 60 define the second fuel cell cavity 70. In between the fuel cell cavities 66, 70, the radiator support housing 102, the pedestals 104, 106 and the rails 108, 110 combined with the structural supports 58, 60 and the central bottom wall portion 72 to define the component cavity 74.

INDUSTRIAL APPLICABILITY

The internal support structure 100 in accordance with the present disclosure provides additional structural support for at the rear end frame 32, as well as providing a way for integrating the fuel cells 34, 36 and the components of the electrical power system within the packaging constraints of the rear end frame 32. The internal support structure 100 provides designated mounting locations (fuel cell cavities 66, 70 and component cavity 74) and frame structure for the fuel cells 34, 36 and other components. Each of the fuel cell cavities 66, 70 is provided with a tapered bottom as described above to provide easy access and removal of the fuel cells 34, 36. The positioning of the control component panels 84 on the fuel cells 34, 36 and the access panel openings 48, 50 allow some maintenance to be performed the fuel cells 34, 36 without removal from the rear end frame 32. The line passage 116 defined by the pedestals 104, 106 allows access for electrical and cooling lines from the electrical power system and the radiator, respectively, to the forward operating systems of the work machine 10. These features facilitate implementation of the electric powered work machine 10 in enclosed work areas without creating exhaust gases that cause deterioration of the conditions within the work environment.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An internal support structure for fuel cells within a work machine having a rear end frame with an exterior frame wall in which the fuel cells are stored, the internal support structure comprising:
 a radiator support housing directly mounted to a bottom wall of the rear end frame, extending upward from the bottom wall and disposed proximate a radiator opening of the exterior frame wall;
 a first pedestal mounted to a top surface of the bottom wall, extending upward from the top surface of the bottom wall and disposed forward of the radiator support housing;
 a second pedestal mounted to the top surface of the bottom wall, extending upward from the top surface of the bottom wall and disposed forward of the radiator support housing;
 a first rail mounted to and extending between the radiator support housing and the first pedestal and vertically spaced above the top surface of the bottom wall; and
 a second rail mounted to and extending between the radiator support housing and the second pedestal and vertically spaced above the top surface of the bottom wall.

2. The internal support structure of claim 1, wherein the first pedestal, the first rail, a first frame portion of the exterior frame wall and a first bottom portion of the bottom wall define a first fuel cell cavity in which a first fuel cell of the fuel cells is disposed, and wherein the second pedestal, the second rail, a second frame portion of the exterior frame wall and a second bottom portion of the bottom wall define a second fuel cell cavity in which a second fuel cell of the fuel cells is disposed.

3. The internal support structure of claim 2, wherein the rear end frame includes a first structural support that is adjacent to the first pedestal and the first rail and defines the first fuel cell cavity, and wherein the rear end frame includes a second structural support that is adjacent to the second pedestal and the second rail and defines the second fuel cell cavity.

4. The internal support structure of claim 1, comprising a support tray mounted between the first rail and the second rail, wherein the support tray receives and supports a battery within the rear end frame.

5. The internal support structure of claim 1, wherein the radiator support housing, the first pedestal, the second pedestal, the first rail, the second rail and a central bottom wall portion of the bottom wall define a component cavity that receives components of an electrical power system of the work machine.

6. The internal support structure of claim 5, wherein the first pedestal and the second pedestal define a line passage through which electrical and cooling lines pass from the component cavity forward toward a front end frame of the work machine.

7. The internal support structure of claim 1, comprising vibration dampening mounts disposed between the radiator support housing and the bottom wall.

8. A work machine comprising:
 a rear end frame having an exterior frame wall and a bottom wall having a top surface; and
 an internal support structure comprising:
  a radiator support housing mounted to the bottom wall of the rear end frame, extending upward from the bottom wall and disposed proximate a radiator opening of the exterior frame wall,
  a first pedestal mounted to the top surface of the bottom wall, extending upward from the top surface of the bottom wall and disposed forward of the radiator support housing,
  a second pedestal mounted to the top surface of the bottom wall, extending upward from the top surface of the bottom wall and disposed forward of the radiator support housing,
  a first rail mounted to and extending between the radiator support housing and the first pedestal and vertically spaced above the top surface of the bottom wall, and
  a second rail mounted to and extending between the radiator support housing and the second pedestal and vertically spaced above the top surface of the bottom wall.

9. The work machine of claim 8, wherein the first pedestal, the first rail, a first frame portion of the exterior frame wall and a first bottom portion of the bottom wall define a first fuel cell cavity in which a first fuel cell is disposed, and wherein the second pedestal, the second rail, a second frame portion of the exterior frame wall and a second bottom portion of the bottom wall define a second fuel cell cavity in which a second fuel cell is disposed.

10. The work machine of claim 9, wherein the first frame portion has a first fuel cell access panel opening defined therein for providing access to the first fuel cell from an exterior of the rear end frame when the first fuel cell is disposed within the first fuel cell cavity, and wherein the second frame portion has a second fuel cell access panel opening defined therein for providing access to the second fuel cell from an exterior of the rear end frame when the second fuel cell is disposed within the second fuel cell cavity.

11. The work machine of claim 9, wherein the rear end frame includes a first structural support that is adjacent to the first pedestal and the first rail and defines the first fuel cell cavity, and wherein the rear end frame includes a second structural support that is adjacent to the second pedestal and the second rail and defines the second fuel cell cavity.

12. The work machine of claim 8, wherein the bottom wall comprises:
 a horizontal bottom wall portion that is approximately parallel to a work surface supporting the work machine; and
 an angled bottom wall portion extending rearward from the horizontal bottom wall portion such that a distance between the angled bottom wall portion and the work surface increases as the angled bottom wall portion extends rearward from the horizontal bottom wall portion.

13. The work machine of claim 8, comprising a support tray mounted between the first rail and the second rail, wherein the support tray receives and supports a battery within the rear end frame.

14. The work machine of claim 8, wherein the radiator support housing, the first pedestal, the second pedestal, the first rail, the second rail and a central bottom wall portion of the bottom wall define a component cavity that receives components of an electrical power system of the work machine.

15. The work machine of claim 14, wherein the first pedestal and the second pedestal define a line passage through which electrical and cooling lines pass from the component cavity forward toward a front end frame of the work machine.

16. The work machine of claim 8, comprising vibration dampening mounts disposed between the radiator support housing and the bottom wall.

17. An internal support structure for fuel cells within a work machine having a rear end frame with an exterior frame wall in which the fuel cells are stored, the internal support structure comprising:
- a radiator support housing mounted to a bottom wall of the rear end frame, extending upward from the bottom wall and disposed proximate a radiator opening of the exterior frame wall;
- a first pedestal mounted to the bottom wall, extending upward from the bottom wall and disposed forward of the radiator support housing;
- a second pedestal mounted to the bottom wall, extending upward from the bottom wall and disposed forward of the radiator support housing;
- a first rail mounted to the radiator support housing and the first pedestal, wherein the first pedestal, the first rail, a first frame portion of the exterior frame wall and a first bottom portion of the bottom wall define a first fuel cell cavity in which a first fuel cell of the fuel cells is disposed;
- a second rail mounted to and extending between the radiator support housing and the second pedestal, wherein the second pedestal, the second rail, a second frame portion of the exterior frame wall and a second bottom portion of the bottom wall define a second fuel cell cavity in which a second fuel cell of the fuel cells is disposed, and wherein the radiator support housing, the first pedestal, the second pedestal, the first rail, the second rail and a central bottom wall portion of the bottom wall define a component cavity that receives components of an electrical power system of the work machine; and
- a support tray mounted between the first rail and the second rail, wherein the support tray receives and supports a battery within the rear end frame.

18. The internal support structure of claim 17, wherein the rear end frame includes a first structural support that is adjacent to the first pedestal and the first rail and defines the first fuel cell cavity, and wherein the rear end frame includes a second structural support that is adjacent to the second pedestal and the second rail and defines the second fuel cell cavity.

19. The internal support structure of claim 17, wherein the first pedestal and the second pedestal define a line passage through which electrical and cooling lines pass from the component cavity forward toward a front end frame of the work machine.

20. The internal support structure of claim 17, comprising vibration dampening mounts disposed between the radiator support housing and the bottom wall.

* * * * *